(12) United States Patent
Tanabe et al.

(10) Patent No.: US 6,382,669 B2
(45) Date of Patent: May 7, 2002

(54) AIRBAG DEVICE

(75) Inventors: Choko Tanabe; Toshinori Tanase, both of Aichi-ken (JP)

(73) Assignee: Toyoda Gosei Co., Ltd., Aichi-Ken (JP)

(*) Notice: Subject to any disclaimer, the term of this patent is extended or adjusted under 35 U.S.C. 154(b) by 0 days.

(21) Appl. No.: 09/790,720

(22) Filed: Feb. 23, 2001

(30) Foreign Application Priority Data

Feb. 24, 2000 (JP) .................................... 2000-048272

(51) Int. Cl.⁷ ................................................ B60R 21/16
(52) U.S. Cl. .................................................. 280/743.1
(58) Field of Search .......................... 280/728.1, 743.1; 428/36.1; 139/389; 442/164

(56) References Cited

U.S. PATENT DOCUMENTS

| | | | |
|---|---|---|---|
| 5,296,278 A | * | 3/1994 | Nishimura et al. |
| 5,685,347 A | * | 11/1997 | Graham et al. |
| 5,897,929 A | | 4/1999 | Ii et al. |
| 5,921,287 A | * | 7/1999 | Bowen et al. |
| 5,967,550 A | | 10/1999 | Shirk et al. |
| 6,012,738 A | | 1/2000 | Beisswenger |
| 6,037,279 A | | 3/2000 | Brookman et al. |
| 6,056,316 A | | 5/2000 | Yamaji et al. |
| 6,291,040 B1 | * | 9/2001 | Moriwaki et al. |

FOREIGN PATENT DOCUMENTS

JP    11-321535    11/1999

* cited by examiner

Primary Examiner—Paul N. Dickson
(74) Attorney, Agent, or Firm—Pillsbury Winthrop LLP (57) ABSTRACT

An airbag device is provided with a double-woven coated airbag in which average values of the number of warps and wefts per square inch in double-weaving are 49 to 50 in one embodiment or 51 or more in another embodiment. With the airbag, peak inner pressure values before and after completion of expansion are set corresponding to the coating weight of the coating agent on the basis of a straight-line formula for a relationship between peak inner pressure values and the coating agent at the time of inflowing of the expansion gas.

6 Claims, 8 Drawing Sheets

| Test No | bag configuration | number of warp | number of weft | coating weight | peak inner pressure value | initial minimum inner pressure value |
|---|---|---|---|---|---|---|
| 1 A | Airbag 10 | 51 | 49 | 100 | 107 | 0 |
| 1 B | ← | ← | ← | ← | 95 | 0 |
| 2 B | Airbag 10V | ← | ← | ← | 91 | 0 |
| 3 A | ← | ← | ← | 150 | 111 | 5 |
| 3 B | ← | ← | ← | ← | 92 | 26 |
| 4 A | Airbag 10 | 54 | 51 | ← | 130 | 2 |
| 4 B | ← | ← | ← | ← | 118 | 24 |
| 5 A | Airbag 10V | ← | ← | ← | 117 | 49 |
| 5 B | ← | ← | ← | ← | 91 | 55 |
| 6 A | ← | ← | ← | 120 | 107 | 24 |
| 7 A | ← | ← | ← | ← | 105 | 20 |
| 8 A | Airbag 10 | ← | ← | ← | 112 | 8 |
| 8 B | ← | ← | ← | ← | 100 | 36 |
| 9 A | ← | 56 | 50.5 | 100 | 99 | 10 |
| 9 B | ← | ← | ← | ← | 92 | 13 |
| 10 B | ← | ← | ← | 120 | 99 | 31 |

AIRBAG DEVICE

This application is based on and claims benefit of priority of Japanese Patent Application No. 2000-048272 filed Feb. 24, 2000, the contents of which are incorporated hereinto by this reference.

BACKGROUND OF THE INVENTION

1. Field of the Invention

The invention relates to an airbag device with an airbag. A coating agent is coated on the airbag so as to inhibit leakage of an expansion gas made to inflow. In particular, the invention relates to an airbag device, in which an airbag can ensure a predetermined or higher inner pressure value during a predetermined time while a coating agent is held down in coating amount. The airbag device includes, for example, a head protective airbag device mounted on a motorcar, an airbag device for lateral collision and mounted on a seat, and the like.

2. Description of Related Art

Conventionally, for example, with a head protective airbag device, an airbag is folded and received to extend over a pillar section and a roof-side rail section on a peripheral edge of an opening on a door on a vehicle-interior side and windows. When an expansion gas is made to flow into an airbag from an inflator for expansion, the airbag is developed and expanded in a manner to cover the opening (Japanese Patent Laid-Open No. 321535/1999).

Also, it has been demanded that with this kind of airbag device, an airbag maintain inner pressure of 10 KPa or higher during about three seconds after the beginning of inflation taking account of turning-sideways of a vehicle.

Therefore, airbags have been manufactured not by sewing but by double-weaving so as to enable inhibiting leakage of an expansion gas having inflowed. Further, a coating agent of silicone rubber is coated on surfaces of an airbag.

Furthermore, it has been contemplated to increase inner pressure values before and after the completion of expansion of an airbag (after about 25 ms lapses since the beginning of inflation), that is, peak inner pressure values of the airbag so that the airbag can maintain inner pressure of 10 KPa or higher during about three seconds after the beginning of inflation. The reason for this is that with high peak inner pressure values, the airbag is believed to be capable of maintaining inner pressure of 10 KPa or higher during about three seconds after the beginning of inflation even when inner pressures in the airbag decrease due to leakage of an expansion gas.

When an airbag becomes high in peak inner pressure values, however, inner pressure values in some cases decrease conversely after three seconds since the beginning of inflation. The reason for this appears that a weaving pattern of an airbag in double-weaving is influenced by high peak inner pressure values to cause widening of texture, thus generating gas leakage.

In order to cope with this, it is conceivable to further increase an amount of a coating agent being applied to an airbag. However, an increased coating amount will lead to an increase in weight of an airbag. Thus this is contrary to the demand for mounting a lightened airbag device on a vehicle.

SUMMARY OF THE INVENTION

An object of the invention is to solve the above-mentioned problems and to provide an airbag device, in which a coating agent is held down in amount of coating and an airbag can maintain inner pressure of a predetermined value or more during a predetermined time after inflation.

The above-mentioned object can be attained by an airbag device according to a first embodiment of the present invention. The airbag device is provided with an airbag, which is folded for receipt in a vehicle in a manner to permit an expansion gas from an inflator to flow thereinto to develop and expand the airbag, which airbag is formed by means of double-weaving, and on which a coating agent of silicone rubber for preventing leakage of the expansion gas through texture is coated. In the airbag, average values of the number of warps and wefts per square inch in double-weaving are 49 to 50 for the first embodiment. With the airbag, peak inner pressure values before and after completion of expansion are set corresponding to the coating weight of the coating agent to be on the basis of a straight line (referred to below as a first boundary line) represented by a straight-line formula (Y=5X/2−100) for a relationship between peak inner pressure values and the coating agent at the time of inflowing of the expansion gas, where in the system of XY coordinates peak inner pressure values (KPa) are indicated by X and the coating weight (g/m$^2$) of the coating agent is indicated by Y, and in the ranges (referred below to as a first boundary range) of 70 KPa or higher and 80 to 155 g/m$^2$ in a leftside region including values on the straight line.

In the airbag device of the first embodiment, peak inner pressure values are set in accordance with the coating weight of the coating agent. For example, in the case where minimum inner pressure values (referred below to as preserving minimum inner pressure values) for about three seconds after inflation is started are 10 KPa or less, peak inner pressure values are decreased in the first boundary range so as to suppress influences of the peak inner pressures. Such corrective action can be performed as by changing the inflator into one having a small output and by increasing a volume of the airbag, into which the expansion gas is caused to flow.

In the airbag of the first embodiment, in which average values of the number of warps and wefts per square inch in double-weaving are 49 to 50, preserving minimum inner pressure values of 10 KPa or higher can be ensured by setting of peak inner pressure values within the first boundary range in accordance with the coating weight of the coating agent in the first boundary range.

Incidentally, preserving minimum inner pressure values of 10 KPa or higher can be ensured in the rightside region with the first boundary line as a standard by increasing the coating weight of the coating agent. In this case, however, the coating agent will be increased in coating amount to lead to an increase in weight of the airbag, and waste of the coating agent is caused.

Also, since the coating weight of the coating agent in the first boundary range is 155 g/m$^2$ or less according to the invention, the coating agent being applied to the airbag can be held down as much as possible.

In addition, if the coating weight of the coating agent is less than 80 g/m$^2$, a sealing quality at the completion of expansion of the airbag cannot be ensured so preservation of inner pressures thereafter cannot be expected.

Also, if peak inner pressure values are less than 70 KPa, the cover covering the folded airbag cannot be moved, which is not practical.

Accordingly, with the airbag device of the first invention, the coating agent is held down in amount of coating and the airbag can maintain inner pressure of 10 KPa or higher during three seconds after inflation.

Also, the above-mentioned object can be attained by an airbag device of a second embodiment of the present invention. The airbag device of the second invention is provided with an airbag, which is folded and received in a vehicle in a manner to permit an expansion gas from an inflator to flow thereinto to develop and expand the airbag, which airbag is formed by means of double-weaving, and on which a coating agent of silicone rubber for preventing leakage of the expansion gas through texture is coated. In the airbag, average values of the number of warps and wefts per square inch in double-weaving are 51 or more. With the airbag, peak inner pressure values before and after completion of expansion are set corresponding to the coating weight of the coating agent to be on the basis of a straight line (referred to below as a second boundary line) represented by a straight-line formula ($Y=5X/2-150$) for a relationship between peak inner pressure values and the coating agent at the time of inflowing of the expansion gas, where in the system of XY coordinates peak inner pressure values (KPa) are indicated by X and the coating weight ($g/m^2$) of the coating agent is indicated by Y, and in the ranges (referred below to as a second boundary range) of 70 KPa or higher and 80 to 155 $g/m^2$ in a leftside region including values on the straight line.

In the airbag device of the second embodiment, peak inner pressure values are set in accordance with the coating weight of the coating agent in the same manner as in the airbag device of the first invention. For example, in the case where preserving minimum inner pressure values for about three seconds after inflation is started are 10 KPa or less, peak inner pressure values are decreased in the second boundary range so as to suppress influences of the peak inner pressures. Such corrective action can be performed as by changing the inflator into one having a small output and by increasing a volume of the airbag, into which the expansion gas is caused to flow.

In the airbag, in which average values of the number of warps and wefts per square inch in double-weaving are 51 or more, preserving minimum inner pressure values of 10 KPa or higher can be ensured by setting of peak inner pressure values within the second boundary range in accordance with the coating weight of the coating agent in the second boundary range.

Incidentally, preserving minimum inner pressure values of 10 KPa or higher can be ensured in the rightside region with the second boundary line as a standard by increasing the coating weight of the coating agent. In this case, however, the coating agent will be increased in coating amount to lead to an increase in weight of the airbag, and there is caused waste of the coating agent.

Also, the coating weight of the coating agent in the second boundary range is 155 $g/m^2$ or less. Therefore, the coating agent being applied to the airbag can be held down as much as possible.

In addition, the reason why the coating weight of the coating agent is 80 $g/m^2$ or more and peak inner pressure values are 70 KPa or more is the same as that for the airbag device of the first embodiment.

Also, the airbag device of the second embodiment has a high weaving density as compared with the airbag device of the first embodiment. Therefore, peak inner pressure values can be set high in the airbag device of the second embodiment. Setting of high peak inner pressure values in the second boundary range makes it possible to shorten the time elapsed until expansion of the airbag is completed.

Accordingly, with the airbag device of the second embodiment, the coating agent is held down in amount of coating and the airbag can maintain inner pressure of 10 KPa or higher during three seconds after inflation. Further, it is possible to shorten the time elapsed until expansion of the airbag is completed.

DESCRIPTION OF THE PREFERRED EMBODIMENTS

The invention will be described below by way of embodiments shown in the drawings. In addition, the invention is not limited to the embodiments. All modifications within the requirements of the claims and equivalents with respect to the requirements should be included in the scope of the claims.

Figure 1:
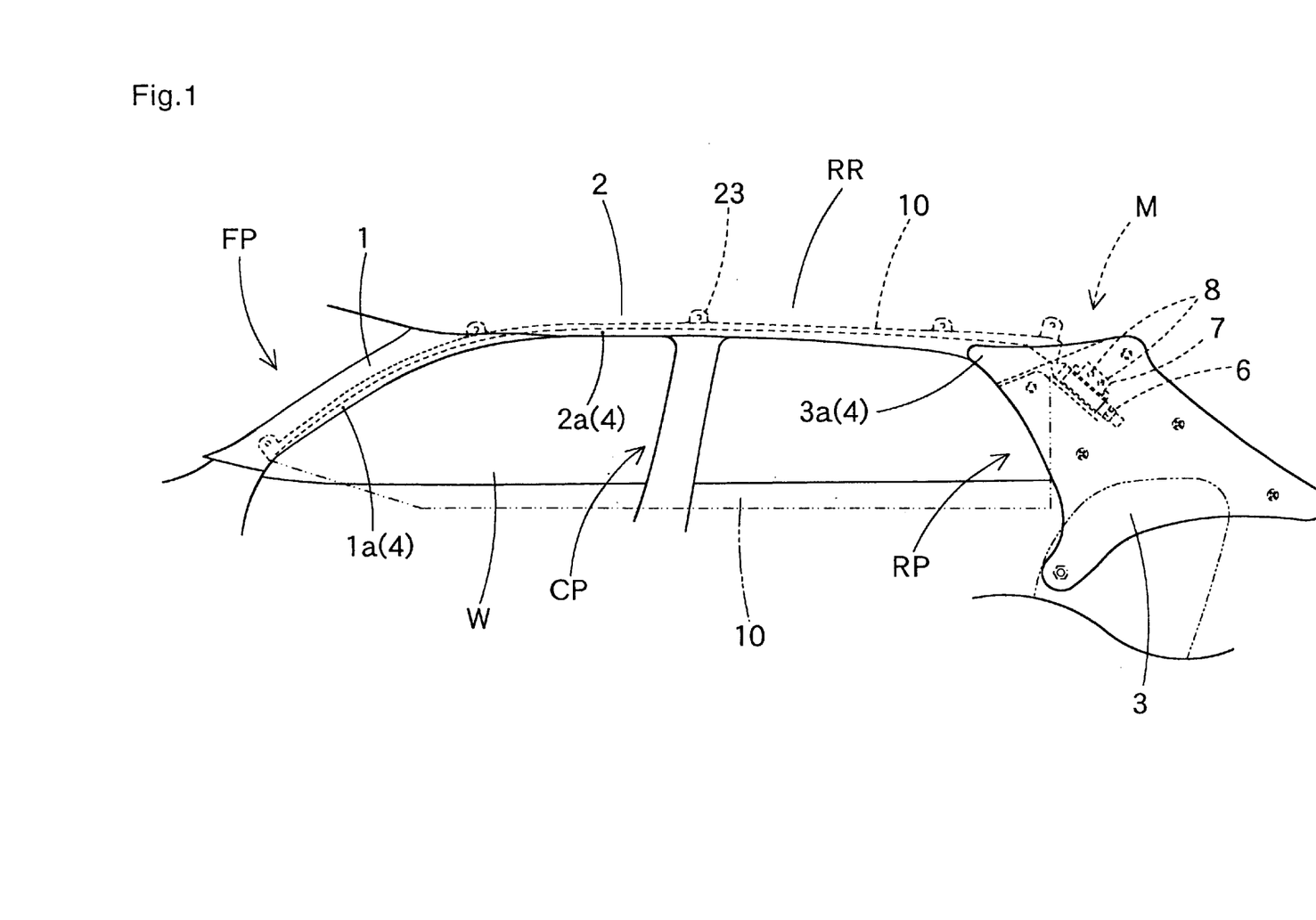
FIG. 1 is a front view showing a state in which a head protective airbag device according to an embodiment of the invention is used.
Figure 2:
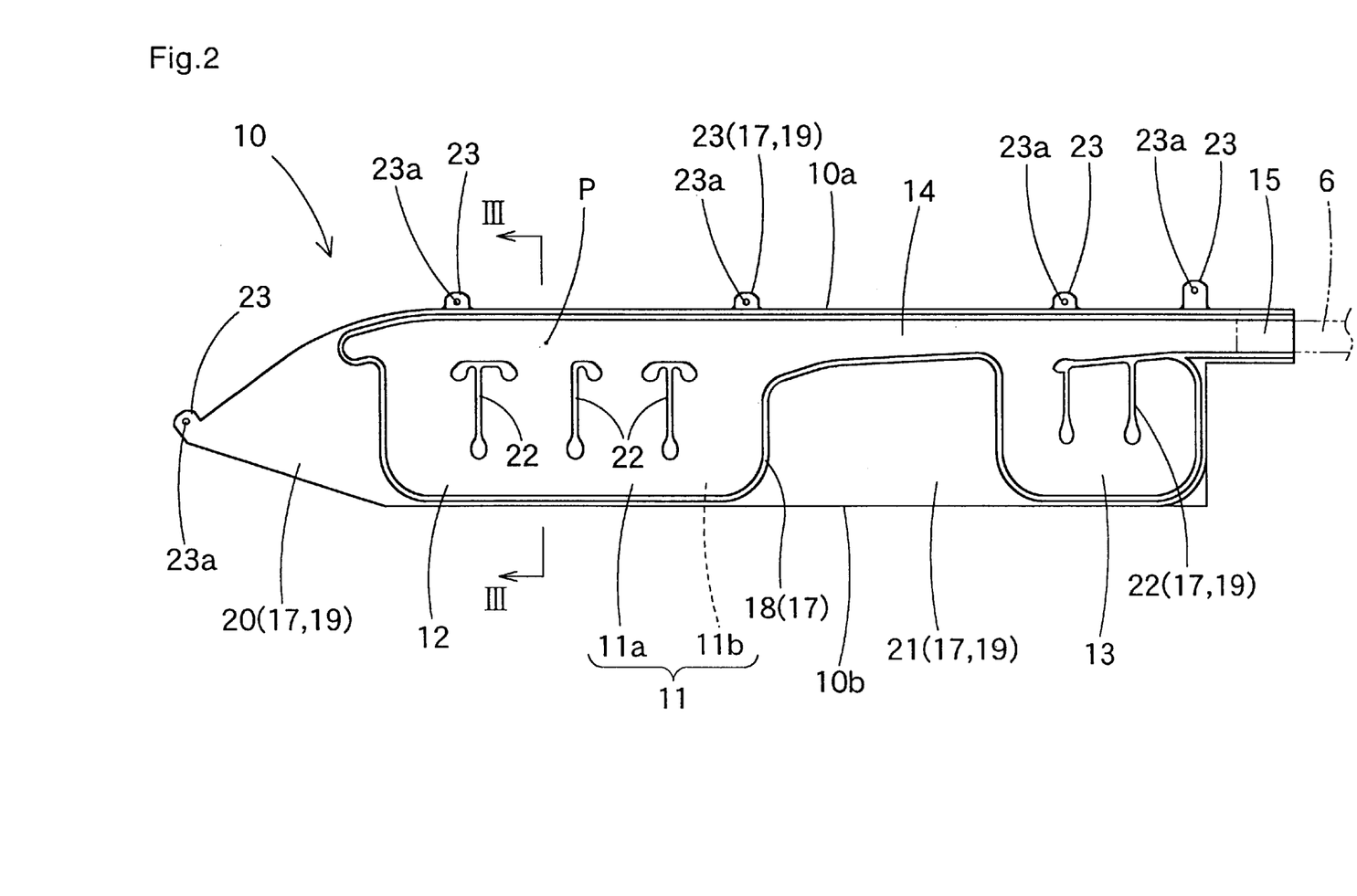
FIG. 2 is a front view showing a state in which the airbag device according to the embodiment is developed and expanded.
Figure 3:
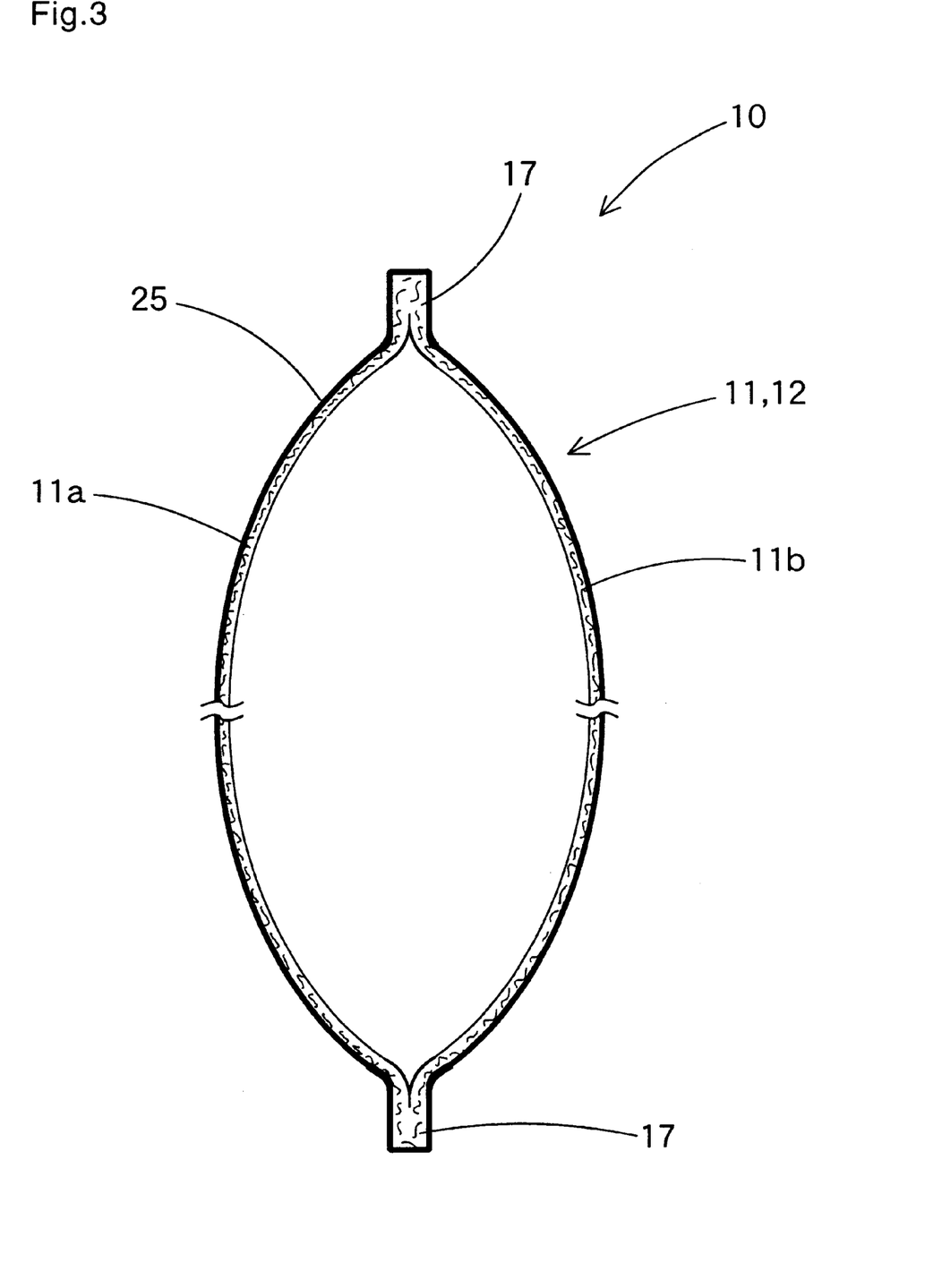
FIG. 3 is an enlarged, schematic cross sectional view taken along the line III—III in FIG. 2.

An airbag device, according to the embodiment shown in FIGS. 1 to 3, comprises a head protective airbag device M. With the airbag device, a folded airbag 10 is arranged on a door on a vehicle-interior side and on a peripheral edge of an opening W on a window. More specifically, the folded airbag 10 is arranged on a front pillar section FP, a roof-side rail section RR, a center pillar section CP and a rear pillar section RP.

The head protective airbag device M comprises an airbag 10, an inflator 6, a mount bracket 7, and an airbag cover 4. The inflator 6 is of a cylinder type to supply an expansion gas to the folded airbag 10. The mount bracket 7 connects the airbag 10 to the inflator 6. Also, the bracket 7 makes use of bolts 8 to fix the inflator 6 to a body. The airbag cover 4 covers the folded airbag 10.

The airbag cover 4 is composed of cover portions 1a, 2a, 3a in the embodiment. The cover portion 1a is composed of a lower edge of a front pillar garnish 1 disposed on the front pillar section FP. The cover portion 2a is composed of a lower edge of a roof vehicle-interior material 2 disposed on the roof-side rail section RR. The cover portion 3a is composed of an upper edge of a rear pillar garnish 3 disposed on the rear pillar section RP. The cover portions 1a, 2a is pushed by the airbag 10 to be opened upward (opened upward from downward) in a vehicle-interior side when the folded airbag 10 is developed and expanded. The airbag 10 is made to protrude toward the vehicle-interior side from a location of the opened cover portion 3a.

The mount bracket 7 is made of a sheet metal to be substantially in the form of a cylinder, which can be reduced in diameter. The bracket 7 presses an introduction portion 15, described later, of the airbag 10 against the inflator 6 to join the inflator 6 and the introduction portion 15 together. Also, the bracket 7 makes use of bolts 8 to mount the inflator 6 and the introduction portion 15 to the body.

The airbag 10 is composed of a gas inflowing portion 11 and a non-inflowing portion 17 as shown in FIGS. 2 and 3. The gas inflowing portion 11 is provided with a space, which is enclosed by two sheets, that is, a vehicle-interior side wall portion 11a and an exterior side wall portion 11b, to permit an expansion gas from the inflator 6 to inflow, thus expanding with an increase in thickness. The non-inflowing portion 17 is a region, into which an expansion gas is not permitted to flow.

The gas inflowing portion 11 is composed of a front vehicle-interior portion 12, a rear vehicle-interior portion 13, a communication portion 14 and the introduction portion 15. The front vehicle-interior portion 12 is arranged laterally of a front seat in a vehicle when the folded airbag 10 is developed and expanded. The rear vehicle-interior portion 13 is arranged laterally of a rear seat in a vehicle when the folded airbag 10 is developed and expanded. The communication portion 14 provides communication between the front vehicle-interior portion 12 and the rear vehicle-interior portion 13. The introduction portion 15 is cylindrical-shaped and permits the inflator 6 to be inserted thereinto. The introduction portion 15 permits an expansion gas to flow into the gas inflowing portion 11 from the rear vehicle-interior portion 13. The introduction portion 15 armors the inflator 6 and is clamped by the mount bracket 7 to be connected to the inflator 6. The introduction portion 15 is opened at its end to be disposed in a rear end of the gas inflowing portion 11.

In addition, a cylindrical inner tube may be suitably arranged on an opening side of an inner periphery of the introduction portion 15 in order to ensure heat resistance against a high temperature expansion gas from the inflator 6. The inner tube is formed by means of double-weaving, for which polyamide yarn or the like is used, in the same manner as the folded airbag 10 is double-weaved as discussed below.

The non-inflowing portion 17 surrounds a periphery of the gas inflowing portion 11 to define an outline shape of the airbag 10. The non-inflowing portion 17 is provided with a boundary portion 18 and a general portion 19. The boundary portion 18 is arranged on a peripheral edge of the gas inflowing portion 11. The general portion 19 is arranged in an area extending from the boundary portion 18 to the outer peripheral edge of the airbag 10 and in a region of the gas inflowing portion 11. The general portion 19 is composed of a front plate portion 20, a rear plate portion 21, restricting portions 22 and mount portions 23. The front and rear plate portions 20, 21 are arranged in a manner to reduce a volume of the gas inflowing portion 11 to enable ensuring the outline shape of the airbag 10. The restricting portions 22 are arranged in a manner to join the interior side wall portion 11a and the exterior side wall portion 11b to each other in a region of the front and rear vehicle-interior portions 12, 13. The restricting portions 22 are arranged in order to make a thickness of the front and rear vehicle-interior portions 12, 13 substantially uniform over an entire area at the time of expansion. The mount portions 23 are arranged in five locations on a side of an upper edge 10a of the airbag 10. The respective mount portions 23, respectively, are provided with mount holes 23a for bolt insertion so as to enable fixing the airbag 10 to the body by means of bolts.

Figure 4:
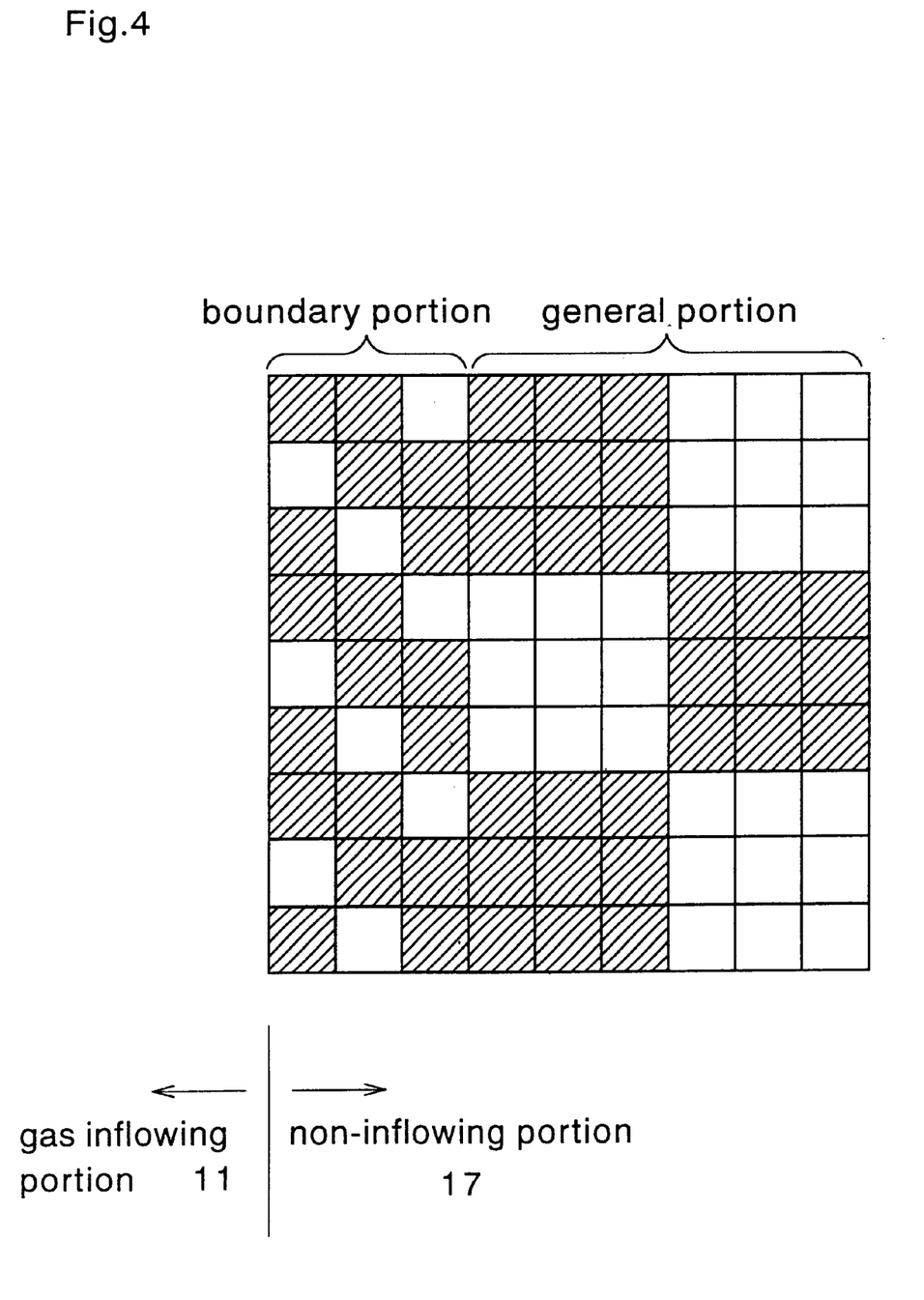
FIG. 4 shows a portion of a weaving pattern in the airbag device according to the embodiment.

Also, the airbag 10 is formed by means of double-weaving, for which polyamide yarn or the like is used. A pattern of the double-weaving in the embodiment is such that the interior side wall portion 11a and the exterior side wall portion 11b in the gas inflowing portion 11 of the airbag 10 are formed in 1×1 plain weave, a region of the boundary portion 18 is formed in 1×2 twill weave as shown in FIG. 4 and the general portion 19 in the non-inflowing portion 17 is formed in 3×3 plain weave. In addition, a region of the restricting portions 22 is formed in 1×2 twill weave in the same manner as the region of the boundary portion 18 is formed.

Further, after being subjected to double-weaving, the airbag 10 is coated with a coating agent 25 of silicone rubber so as to be enhanced in heat resistance and prevent leakage of an expansion gas. Such coating is performed by spray coating, brush coating or the like. Incidentally, the coating agent 25 cannot be applied on an inner peripheral side of the airbag 10 after weaving of the airbag 10 since the restricting portions 22 and the like interfere. Therefore, the coating agent 25 is applied on an outer peripheral side of the airbag 10.

An explanation will be given to how to load the airbag 10 on a vehicle. First, accordion folding, in which folds are formed in multiple stages in a longitudinal direction, is made use of to fold the airbag 10 so as to approach a side of a lower edge 10b toward a side of an upper edge 10a. Thereafter, patches are mounted to the respective mount portions 23. Also, the inflator 6 is inserted into the introduction portion 15. Then the mount bracket 7 is made to armor the introduction portion 15, and caulked. Thus the introduction portion 15 and the inflator 6 can be joined to each other.

The airbag device M can be loaded on a vehicle by using bolts to fix to the body the respective mount portions 23 together with the patches, and using the bolts 8 to fix the mount bracket 7 to the body. In addition, at the time of loading, lead wires (not shown) extending from the inflator 6 are connected to a predetermined airbag operating circuit. Also, after the airbag device M has been loaded on a vehicle, the garnishes 1, 3 in the front and rear pillar sections FP, RP are mounted to the body, and the roof interior material 2 in the roof-side rail section RR is mounted to the body.

After the airbag device M has been loaded on a vehicle, an expansion gas is caused to flow into the gas inflowing portion 11 from the introduction portion 15 provided that the inflator 6 is actuated. Therefore, the airbag 10 pushes the airbag cover 4 open as shown by two-dot chain lines in FIG. 1 to develop and expand in a manner to cover the opening W.

Figure 5:
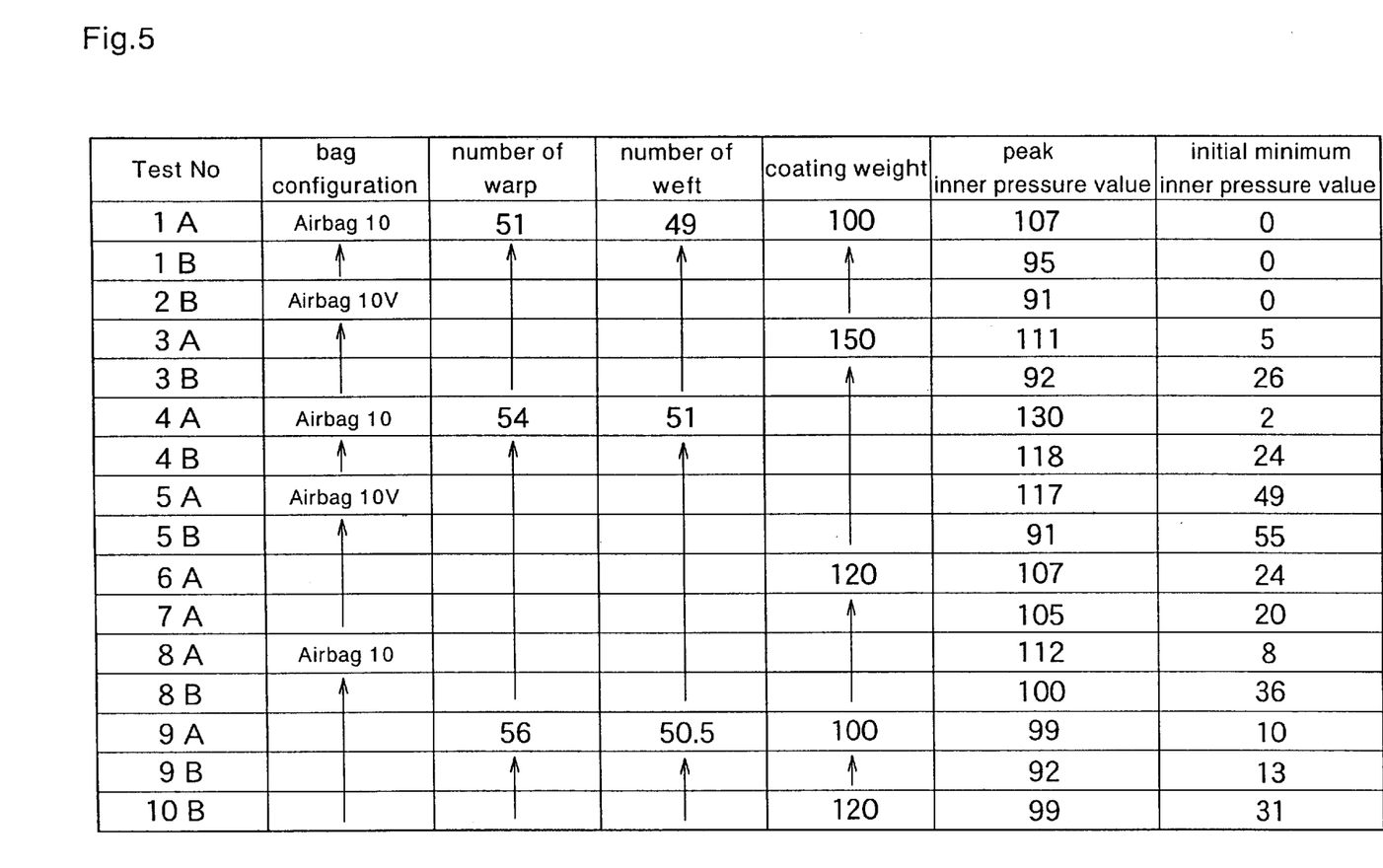
FIG. 5 is a table of measurements of peak inner pressure values and preserving minimum inner pressure values of expanded respective airbags in a state in which a coating agent being applied to an airbag is varied in coating weight and two kinds of inflators having large and small outputs are replaced by one another.

FIG. 5 shows results of measurement of peak inner pressure values (KPa) and preserving minimum inner pressure values (KPa) with respect to inner pressures in the airbag 10 at the time of expansion. A plurality of airbags as measured were changed differently in coating weight (g/m$^2$) per one side of the coating agent 25 on interior and exterior sides. Also, two kinds of inflators 6 different in dimensions and output were suitably mounted to these airbags.

In addition, such measurement was carried out in a state in which the respective airbags were singly developed and expanded. Also, inner pressure values in the respective airbags were measured at a point P in FIG. 2.

Also, an airbag designated by an alphabet A in the last of Test No. made use of an inflator 6 having a great output. An airbag designated by an alphabet B in the last of Test No. made use of an inflator 6 having a small output.

Figure 9:
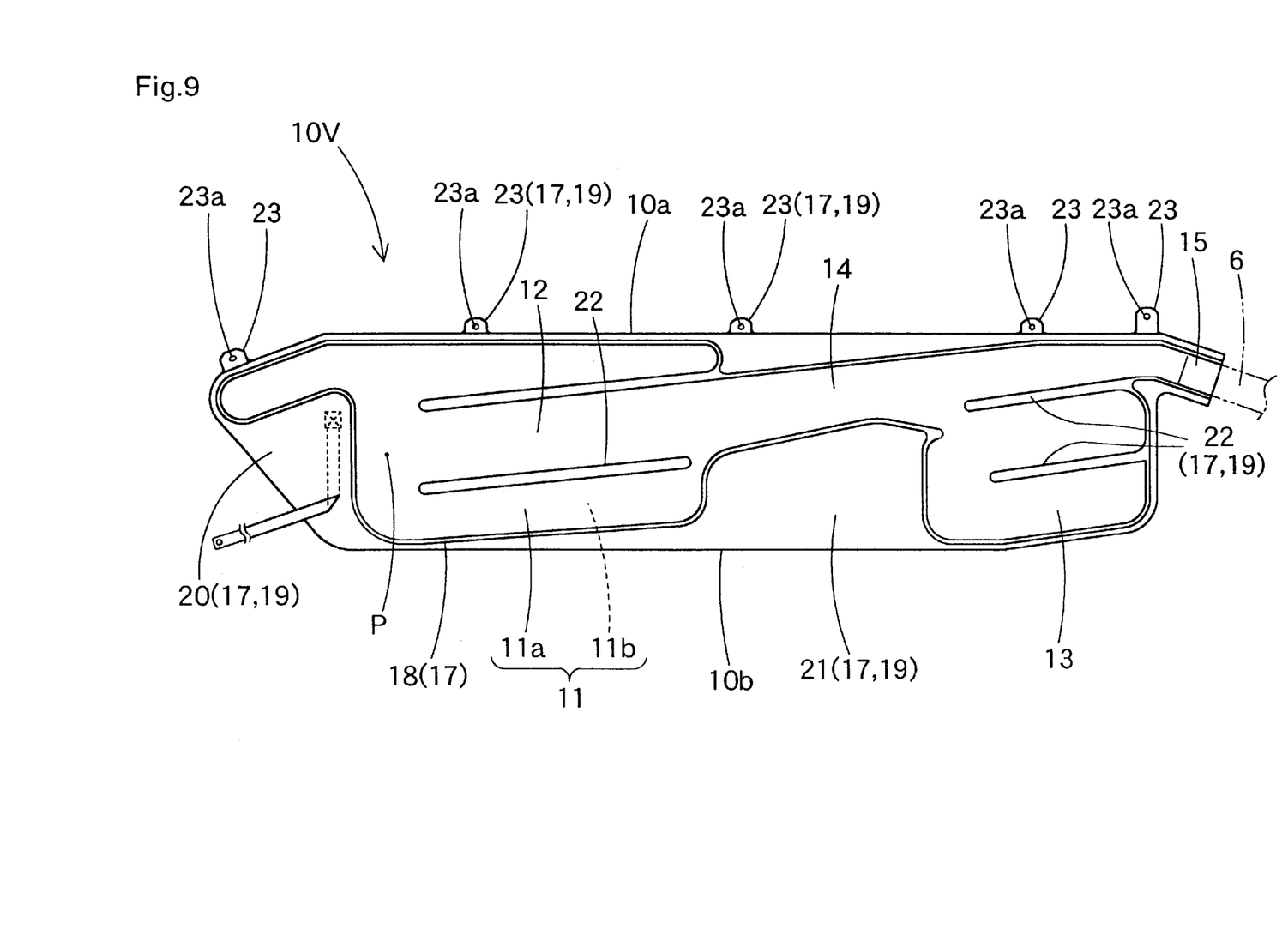
FIG. 9 is a front view showing airbags having other configurations.

Further, an airbag 10V shown in FIG. 9 was used in addition to airbags having a shape shown in FIG. 2. The airbag 10V is designed such that an expansion gas flowing from the introduction portion 15 is introduced immediately into a region of the front vehicle-interior portion 12 centrally in a vertical direction via the communication portion 14. With the airbag 10V, expansion of the front vehicle-interior portion 12 distant from the inflator can be rapidly effected. In addition, the same parts of the airbag 10V as those in FIG. 2 are designated by the same reference numerals, and an explanation thereof is omitted.

Also, measurement of airbags was performed for the airbags 10, 10V, which were woven in weaving densities of three kinds. The weaving densities of three kinds were such that the number of plunging wefts and warps, which constitute a weaving pattern in the gas inflowing portion 11, per square inch included three kinds of 51 warps and 49 wefts, 54 warps and 51 wefts, and 56 warps and 50.5 wefts. In addition, the weaving densities in the non-inflowing portion 17 were two times the above-mentioned number. Further, yarn used in double-weaving was one of polyamide (66 nylon) having 420 denier.

Figure 6:
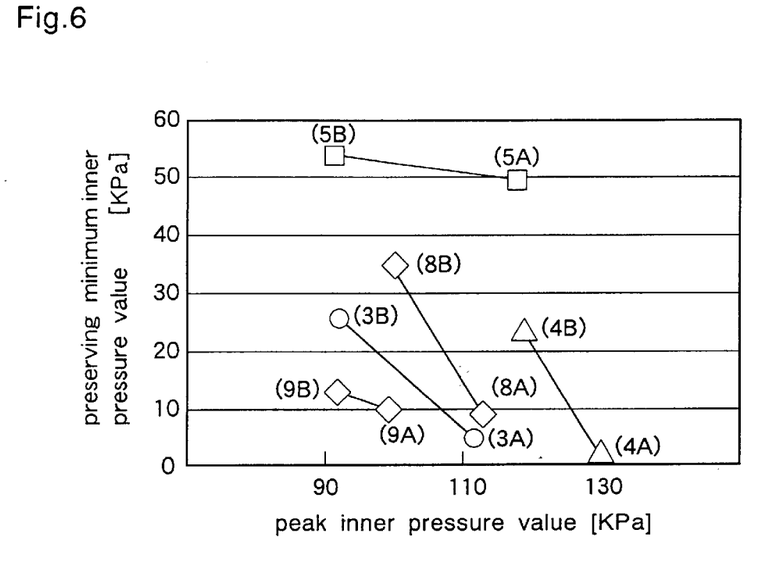
FIG. 6 is a graph showing peak inner pressure values and preserving minimum inner pressure values of respective airbags in the case where a coating agent being applied to airbags has the same coating weight and airbags have the same weaving density and an inflator is varied in output.

In the TABLE in FIG. 5, five groups (Test Nos. 3A.3B, 4A.4B, 5A.5B, 8A.8B and 9A.9B), in which the coating agent 25 was the same in coating weight and weaving density, and the inflator 6 was changed in output, were sampled. FIG. 6 shows in the system of XY coordinates a relationship between peak inner pressure values (KPa) and preserving minimum inner pressure values (KPa) for the respective sampled airbags 10, 10V. It is found from the graph that even with the coating agent 25 being the same in coating weight, the preserving minimum inner pressure values became 10 KPa or less in some cases when the peak inner pressure values were high. That is, the peak inner pressure values were high for the airbags 10, 10V in Tests Nos. 3A, 4A and 8A. However, the preserving minimum inner pressure values were 10 KPa or less for the airbags 10, 10V in these Tests Nos. 3A, 4A and 8A. Also, the peak inner pressure values were small for the airbags 10, 10V in these Tests Nos. 3B, 4B and 8B, in which coating weight was the same and the inflators 6 having a small output were used to suppress the peak inner pressure values. With the airbags 10, 10V in these Tests Nos. 3B, 4B and 8B, however, the peak inner pressure values of 10 KPa or higher were ensured. Similarly, with the airbags 10 in Tests Nos. 9A and 9B, the preserving minimum inner pressure values were kept at 10 KPa or higher. With the airbag 10 in Test 9A, in which the peak inner pressure values were high, however, the preserving minimum inner pressure values were lower than those with the airbag 10 in Test 9B, in which the peak inner pressure values were low.

Figure 7:
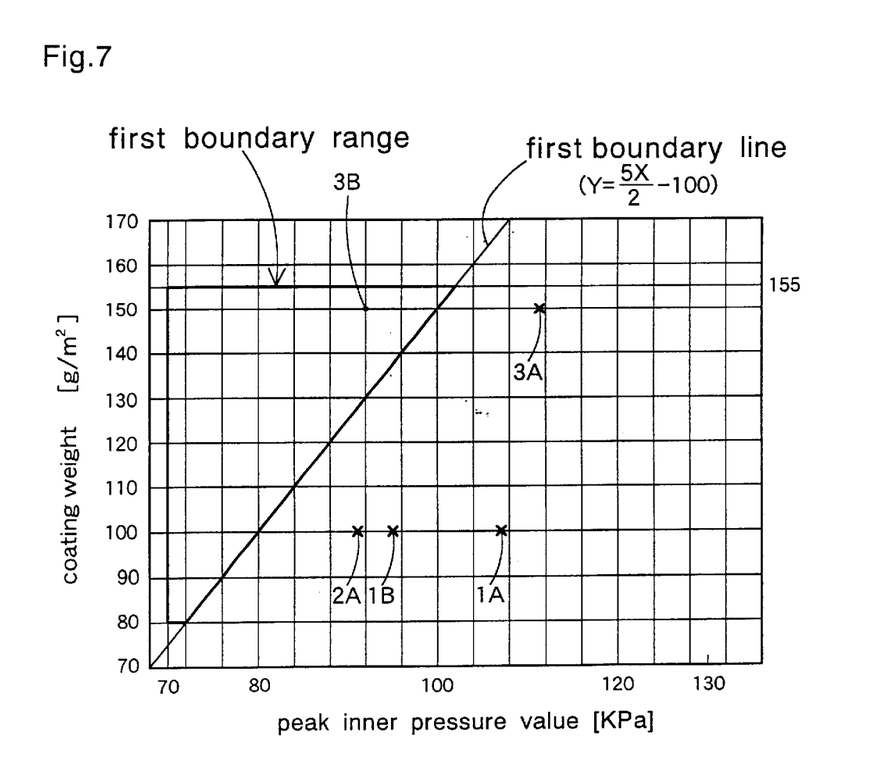
FIG. 7 is a graph showing a relationship between peak inner pressure values and the coating weight for respective airbags, in which the numbers of warps and wefts per square inch in double-weaving are 51 and 49, respectively.
Figure 8:
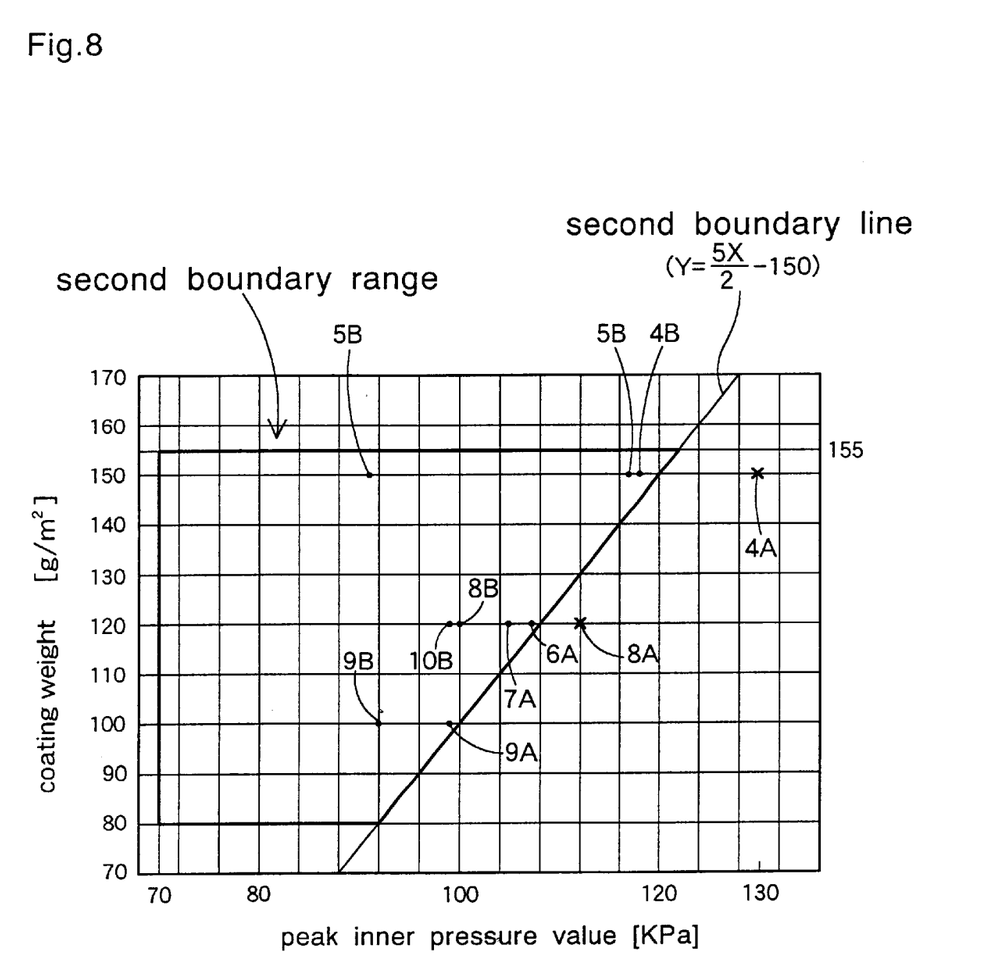
FIG. 8 is a graph showing a relationship between peak inner pressure values and the coating weight for respective airbags, in which the numbers of warps and wefts per square inch in double-weaving are 54 of warps and 51 of wefts, and 56 of warps and 50.5 of wefts.

Further, FIGS. 7 and 8 show in the system of XY coordinates a relationship between peak inner pressure values (KPa) and coating weight (g/m$^2$) of the coating agent 25 for the airbags 10, 10V in all the Test Nos. In FIGS. 7 and 8, solid circles indicate those airbags, in which the preserving minimum inner pressure values became 10 KPa or higher, and indicate those airbags, in which the preserving minimum inner pressure values were less than 10 KPa.

Also, with the airbags 10, 10V shown in FIG. 7, average values of the number of warps and wefts per square inch in the gas inflowing portion 11 were in the range of 49 to 50. More specifically, the airbags 10, 10V shown in FIG. 7 had the weaving density with 51 warps and 49 wefts.

For the airbags 10, 10V, FIG. 8 shows that the average values of the number of warps and wefts per square inch in the gas inflowing portion 11 were in the range of 51 or more. More specifically, the airbags 10, 10V used for the FIG. 8 graph had two kinds of weaving densities, which included 54 warps and 51 wefts, and 56 warps and 50.5 wefts.

In FIG. 7, a straight line passing points (100, 150) and (80, 100), that is, a first boundary line represented by a straight-line formula (Y=5X/2−100) is used as a reference. As seen from FIG. 7, the preserving minimum inner pressure values having 10 KPa or higher can be ensured in a leftside region including values on the first boundary line. Of course, it is required in the leftside region of the first boundary line that the peak inner pressure values be 70 KPa or higher and the coating agent 25 have the coating weight in the range (first boundary range) of 80 to 155 g/m$^2$.

The reason for this is that the peak inner pressure value of less than 70 KPa is not practical because the cover 4 covering the folded airbag cannot be moved. Also, the reason for this is that preserving the inner pressure thereafter cannot be expected in the case of the coating weight of the coating agent 25 being less than 80 g/m$^2$ because the sealing quality cannot be ensured at the completion of expansion of the airbags 10, 10V.

For the airbags 10, 10V, FIG. 7 shows that a corrective action is performed by lowering the peak inner pressure value within the first boundary range so as to suppress influences of the peak inner pressures when the preserving minimum inner pressure values fall below 10 KPa for about three seconds after inflation is started. Such corrective action can be performed as by changing the inflator 6 into one having a small output. Then it is seen from FIG. 7 that the preserving minimum inner pressure values of 10 KPa or higher can be ensured in these airbags 10, 10V.

Of course, the preserving minimum inner pressure values of 10 KPa or higher can be ensured in the rightside region with the first boundary line as a standard when the coating agent 25 is increased in coating weight. For example, the peak inner pressure value is 107 KPa in the airbag 10 of Test No. 1A. Thus, with the airbag 10 of Test No. 1A, the coating agent 25 is made in coating weight in the order of 170 g/m$^2$ so that the inner pressure value comes in the leftside region of the first boundary line. Then the preserving minimum inner pressure values of 10 KPa or higher can be ensured in the airbag 10 of Test No. 1A. Also, with the airbag 10V of Test No. 2B, when the coating agent 25 is made in coating weight in the order of 130 g/m$^2$, the preserving minimum inner pressure values of 10 KPa or higher can be ensured so that the inner pressure value comes in the leftside region of the first boundary line. With the above procedure, however, the coating agent 25 will be increased in coating amount to lead to an increase in weight of the airbags 10, 10V. Also, there is caused waste of the coating agent 25.

Therefore, the coating agent 25 in the first boundary range favorably has 155 g/m$^2$ of coating weight. In this range, the coating agent 25 being applied to the airbags 10, 10V can be suppressed to the utmost in coating amount.

Accordingly, with the airbags 10, 10V, in which average values of the number of warps and wefts per square inch in double-weaving are 49 to 50, setting of the peak inner pressure value in the first boundary range in accordance with coating weight of the coating agent 25 in the first boundary range suppresses a coating amount of the coating agent 25 and enables maintaining the inner pressure of 10 KPa or higher for three seconds after inflation.

In addition, the corrective action for lowering the peak inner pressure values in the airbags 10, 10V can be adopted to include replacement to an inflator 6 of small output, enlargement of a volume of the gas inflowing portion 11 of the airbags 10, 10V or the like.

Similarly, a straight line passing (120, 150) and (100, 100), that is, a second boundary line represented by a straight-line formula (Y=5X/2−150) is used as a standard in FIG. 8. As seen from FIG. 8, the preserving minimum inner pressure values having 10 KPa or higher can be ensured in a leftside region including values on the second boundary line. Of course, it is required in the leftside region of the second boundary line that the peak inner pressure values be 70 KPa or higher and the coating agent 25 have a coating weight in the range (second boundary range) of 80 to 155 g/m$^2$ in the same manner as described above.

For the airbags 10, 10V, FIG. 8 shows that a corrective action is performed by lowering the peak inner pressure value within the second boundary range so as to suppress influences of the peak inner pressures when the preserving minimum inner pressure values fall below 10 KPa for about three seconds after inflation is started. Such corrective action can be performed as by changing the inflator 6 into one having a small output. Alternatively, corrective action is performed by increasing the volume of the airbags 10, 10V, into which an expansion gas is made to flow.

With the airbags 10, 10V, in which average values of the number of warps and wefts per square inch in double-weaving are 51 or more, setting of the peak inner pressure value in the second boundary range in accordance with coating weight of the coating agent 25 in the second boundary range enables ensuring the preserving minimum inner pressure values of 10 KPa or higher.

Incidentally, the preserving minimum inner pressure values of 10 KPa or higher can be ensured in a rightside region with the second boundary line as a standard when the coating agent 25 is increased in coating weight. For example, the peak inner pressure value is 112 KPa in the airbag 10 of Test No. 8A. Thus, when the coating agent 25 is made in coating weight in the order of 135 g/m$^2$ so that the inner pressure value comes in the leftside region of the second boundary line, the preserving minimum inner pressure values of 10 KPa or higher can be ensured. With the above procedure, however, the coating agent 25 will be increased in coating amount to lead to an increase in weight of the airbags 10, 10V, so that there is caused waste of the coating agent 25.

Accordingly, with the airbags 10, 10V, in which average values of the number of warps and wefts per square inch in double-weaving are 51 or more, setting of the peak inner pressure value in the second boundary range in accordance with coating weight of the coating agent 25 in the second boundary range suppresses a coating amount of the coating agent 25 and enables ensuring the inner pressure value of 10 KPa or higher for three seconds after inflation.

In addition, with the airbags 10, 10V, in which average values of the number of warps and wefts per square inch in double-weaving are 51 or more, the weaving density is made large. Therefore, with these airbags 10, 10V, it is possible to set high peak inner pressure values. Setting of high peak inner pressure values makes it possible to shorten the time elapsed until expansion of the airbags 10, 10V is completed.

While the airbag device M has been illustrated and described for head protection and the airbag 10, 10V is arranged on the front pillar section FP, the roof-side rail section RR and the rear pillar section RP, the airbag may be arranged on the front pillar section FP and the roof-side rail section RR over the center pillar section CP. Further, the invention may be applied to an airbag device, which is mounted on a seat, for side collision.

What is claimed is:

1. An airbag device comprising:
    a double-woven airbag, which is folded for receipt in a vehicle in a manner to permit an expansion gas from an inflator to flow thereinto to develop and expand the airbag,
    said airbag having warps and wefts with average values of the number of warps and wefts per square inch in double-weaving being 49 to 50,
    a coating agent of silicone rubber on said airbag for preventing leakage of the expansion gas through texture,
    the airbag device being such that peak inner pressure values before and after completion of expansion of the airbag correspond to the coating weight of the coating agent on the basis of the straight line represented by the straight-line formula Y=5X/2−100 for a relationship between peak inner pressure values and the coating agent at the time of inflowing of the expansion gas,
    where, in the system of XY coordinates, peak inner pressure values (KPa) are indicated by X and the coating weight (g/m$^2$) of the coating agent is indicated by Y, and in the ranges of 70 KPa or higher and 80 to 155 g/m$^2$ in a leftside region including values on the straight line.

2. The airbag device according to claim 1, wherein said peak inner pressure values are adjusted by adjustment of outputs of the inflator.

3. The airbag device according to claim 1, wherein said peak inner pressure values are adjusted by adjustment of a volume of the airbag, into which the expansion gas is caused to flow.

4. An airbag device comprising:
    a double-woven airbag, which is folded for receipt in a vehicle in a manner to permit an expansion gas from an inflator to flow thereinto to develop and expand the airbag,
    said airbag having warps and wefts with average values of the number of warps and wefts per square inch in double-weaving being 51 or more,
    a coating agent of silicone rubber on said airbag for preventing leakage of the expansion gas through texture is coated,
    the airbag device being such that peak inner pressure values before and after completion of expansion of the airbag are set corresponding to the coating weight of the coating agent on the basis of the straight line represented by the straight-line formula Y=5X/2−150 for a relationship between peak inner pressure values and the coating agent at the time of inflowing of the expansion gas,
    where, in the system of XY coordinates peak inner pressure values (KPa) are indicated by X and the coating weight (g/m$^2$) of the coating agent is indicated by Y, and in the ranges of 70 KPa or higher and 80 to 155 g/m² in a leftside region including values on the straight line.

5. The airbag device according to claim 4, wherein setting of the peak inner pressure values is made by adjustment of outputs of the inflator.

6. The airbag device according to claim 4, wherein setting of the peak inner pressure values is made by adjustment of a volume of the airbag, into which the expansion gas is caused to flow.

* * * * *